United States Patent
Tatman et al.

(10) Patent No.: US 9,896,955 B2
(45) Date of Patent: Feb. 20, 2018

(54) STATIC AXIAL BRUSH SEAL WITH DUAL BRISTLE PACKS

(71) Applicant: United Technologies Corporation, Hartford, CT (US)

(72) Inventors: Neil L. Tatman, Brentwood, NH (US); Jose R. Paulino, Saco, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 312 days.

(21) Appl. No.: 14/685,416

(22) Filed: Apr. 13, 2015

(65) Prior Publication Data
US 2016/0298475 A1 Oct. 13, 2016

(51) Int. Cl.
| F01D 11/00 | (2006.01) |
| F01D 25/24 | (2006.01) |
| F16J 15/02 | (2006.01) |
| F01D 11/08 | (2006.01) |

(52) U.S. Cl.
CPC ............ *F01D 11/005* (2013.01); *F01D 11/08* (2013.01); *F01D 25/246* (2013.01); *F16J 15/025* (2013.01); *F05D 2220/32* (2013.01); *F05D 2240/11* (2013.01); *F05D 2240/12* (2013.01); *F05D 2240/56* (2013.01)

(58) Field of Classification Search
CPC ........ F01D 11/005; F01D 9/041; F01D 11/08; F16J 15/025; F16J 15/3288
See application file for complete search history.

(56) References Cited

U.S. PATENT DOCUMENTS

| 5,110,033 | A  | * | 5/1992  | Noone ................. | F16J 15/3288 228/160 |
| 5,201,530 | A  | * | 4/1993  | Kelch .................. | F16J 15/3288 277/355 |
| 5,704,760 | A  |   | 1/1998  | Bouchard et al. | |
| 5,749,584 | A  | * | 5/1998  | Skinner .................. | F01D 9/023 277/355 |
| 6,170,831 | B1 | * | 1/2001  | Bouchard ............. | F01D 11/005 277/355 |
| 6,250,641 | B1 | * | 6/2001  | Dinc .................... | F16J 15/3288 277/355 |
| 6,331,006 | B1 | * | 12/2001 | Baily ..................... | F01D 11/08 277/355 |
| 6,808,179 | B1 | * | 10/2004 | Bhattacharyya ........ | F01D 11/00 277/348 |
| 7,637,719 | B2 | * | 12/2009 | Graebeldinger ...... | F01D 11/025 277/355 |

(Continued)

OTHER PUBLICATIONS

Extended European Search Report dated Oct. 4, 2016 in European Application No. 16155592.5.

*Primary Examiner* — Igor Kershteyn
*Assistant Examiner* — Eric Zamora Alvarez
(74) *Attorney, Agent, or Firm* — Snell & Wilmer, L.L.P.

(57) ABSTRACT

A brush seal is provided. The brush seal may comprise an annular backing plate and a first bristle pack coupled to the annular backing plate. The first bristle pack may be oriented in an axial direction. A second bristle pack may be coupled to the first bristle pack and oriented in the axial direction. A bristle of the first bristle pack may have a greater diameter than a bristle of the second bristle pack. A retention structure may be coupled to the second bristle pack.

20 Claims, 7 Drawing Sheets

(56) References Cited

U.S. PATENT DOCUMENTS

| | | | | |
|---|---|---|---|---|
| 8,051,563 B2* | 11/2011 | Adis | ............... | F16J 15/3288 |
| | | | | 29/888.3 |
| 8,657,298 B2* | 2/2014 | Zheng | ............... | F16J 15/3288 |
| | | | | 277/355 |
| 8,888,441 B2* | 11/2014 | Jordy | ............... | F01D 11/02 |
| | | | | 415/111 |
| 2005/0006851 A1* | 1/2005 | Addis | ............... | F16J 15/3288 |
| | | | | 277/355 |

* cited by examiner

STATIC AXIAL BRUSH SEAL WITH DUAL BRISTLE PACKS

GOVERNMENT LICENSE RIGHTS

This disclosure was made with government support under contract No. FA8650-09-D-2923 0021 awarded by the United States Air Force. The government has certain rights in the disclosure.

FIELD OF INVENTION

The present disclosure relates to gas turbine engines, and, more specifically, to a dual density bristle pack static brush seal oriented in an axial direction.

BACKGROUND

Gas turbine engines may comprise multiple gas flows at different temperatures and pressures. For example, the engine may have a primary or core air flow and a separate cooling air flow. Gas in the primary or core airflow in a turbine section, for example may be hot compared to the cooling air flowing in internal cavities of the turbine parts. In some locations, seals may be used to prevent or limit the bleed gas from one area of the engine to another.

One location of the engine where sealing may be used is between a blade outer air seal and a vane in a turbine. In some instances, the blade outer air seal and vane may have a large relative axial motion between them. The large axial motion combined with a large pressure differential between the cooling air and primary airflow air may lead to gas leaking from one section of the engine to another.

SUMMARY

A brush seal may comprise an annular backing plate and a first bristle pack coupled to the annular backing plate. The first bristle pack may be oriented in an axial direction. A second bristle pack may be coupled to the first bristle pack and oriented in the axial direction. A bristle of the first bristle pack may have a greater diameter than a bristle of the second bristle pack. A retention structure may be coupled to the second bristle pack.

In various embodiments, the first bristle may have a diameter of 0.006 inches. The second bristle may have a diameter of 0.0028 inches. The first bristle pack may be radially inward from the second bristle pack. The first bristle pack may be oriented at a 60 degree angle relative to an axis of the annular backing plate. The second bristle pack may be oriented at a 47.5 degree angle relative to an axis of the annular backing plate. The annular backing plate, the first bristle pack, the second bristle pack, and the retention structure may be coupled by an electron-beam or other type of weld. An anti-rotation structure may be to the retention structure. A shiplap structure may span a split defined by the annular backing plate. The second bristle pack may have a greater axial length than the first bristle pack. The retention structure may be oriented flush with an aft end of the first bristle pack.

A high-pressure turbine may comprise a vane, a blade outer air seal (BOAS) aft of the vane and a seal support radially outward of the BOAS. The BOAS may be coupled to the seal support. An annular brush seal may be disposed about an axis and coupled to the seal support. The annular brush seal may comprise a backing plate, a proximal bristle pack coupled to the backing plate, and a distal bristle pack coupled to the proximal bristle pack. A first bristle of the proximal bristle pack may include a greater diameter than a second bristle of the distal bristle pack. A retention structure may be coupled to the distal bristle pack.

In various embodiments, the first bristle may have a first diameter of 0.006 inches.

The second bristle may have a second diameter of 0.0028 inches. An anti-rotation structure may be coupled to the retention structure. The first bristle may be oriented at a 60 degree angle relative to the axis. The second bristle may be oriented at a 47.5 degree angle relative to the axis. The distal bristle pack may have a greater axial length than the proximal bristle pack.

A sealing structure may comprise a first annular bristle pack disposed about an axis and comprising a first bristle. The first bristle may have a first diameter of 0.0028 inches and may be oriented at a 60 degree angle relative to the axis. A second annular bristle pack may be disposed about the axis and coupled to the first annular bristle pack. The second annular bristle pack may include a second bristle with a second diameter of 0.006 inches. The second bristle may be oriented at a 47.5 degree angle relative to the axis.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
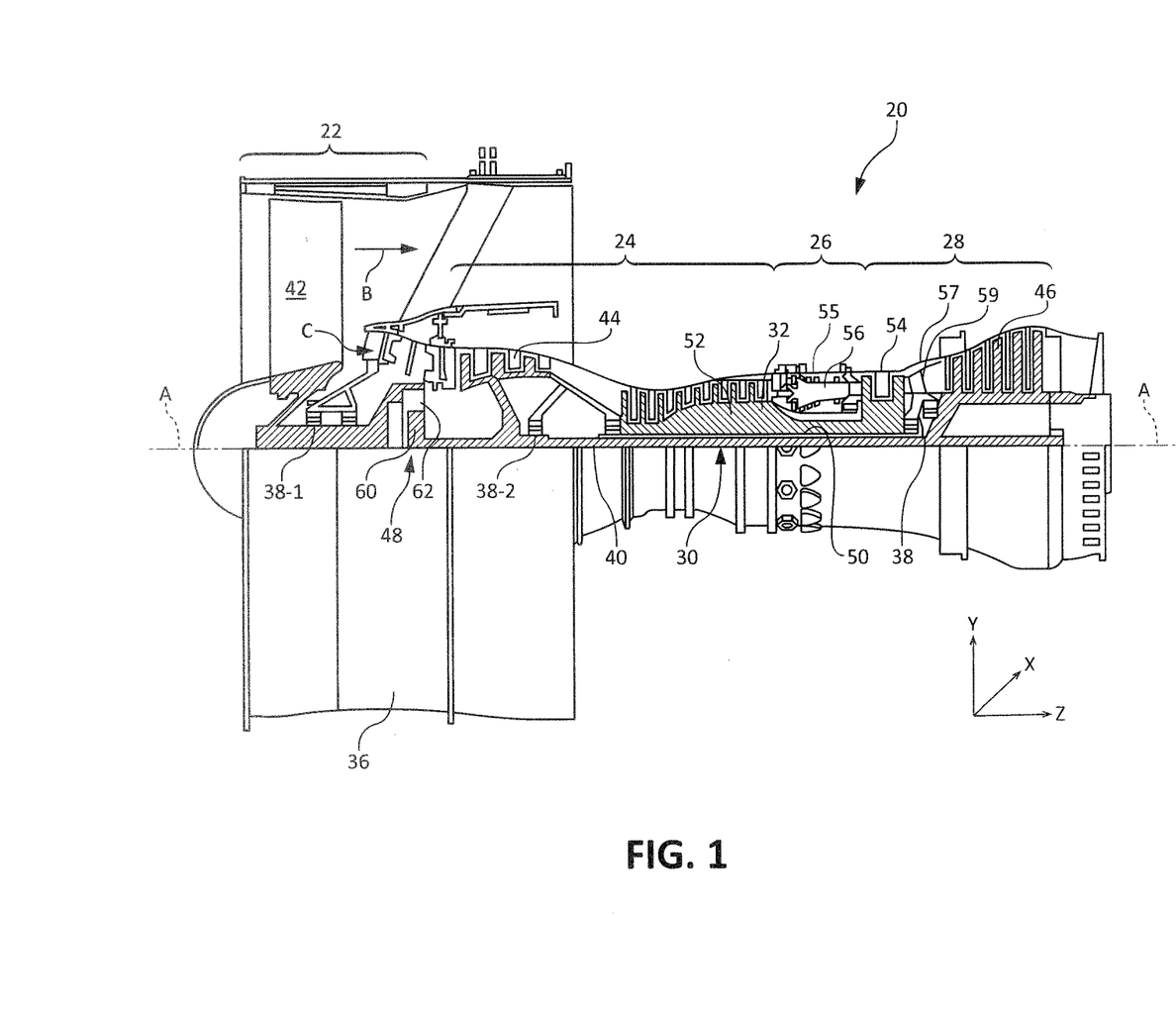
FIG. 1 illustrates an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor section 44 and a low pressure turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. Diffuser case 55 may be disposed around combustor 56. An air cooling system may extract air from diffuser case 55 and deliver the air to cool disks in high pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46 to extract energy from the burned mixture. Mid-turbine frame 57 includes airfoils 59 which are in the core airflow path. Mid-turbine frame 57 may also contact bearing system 38 such that excessive deflection of mid-turbine frame 57 may interfere with engine operation. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
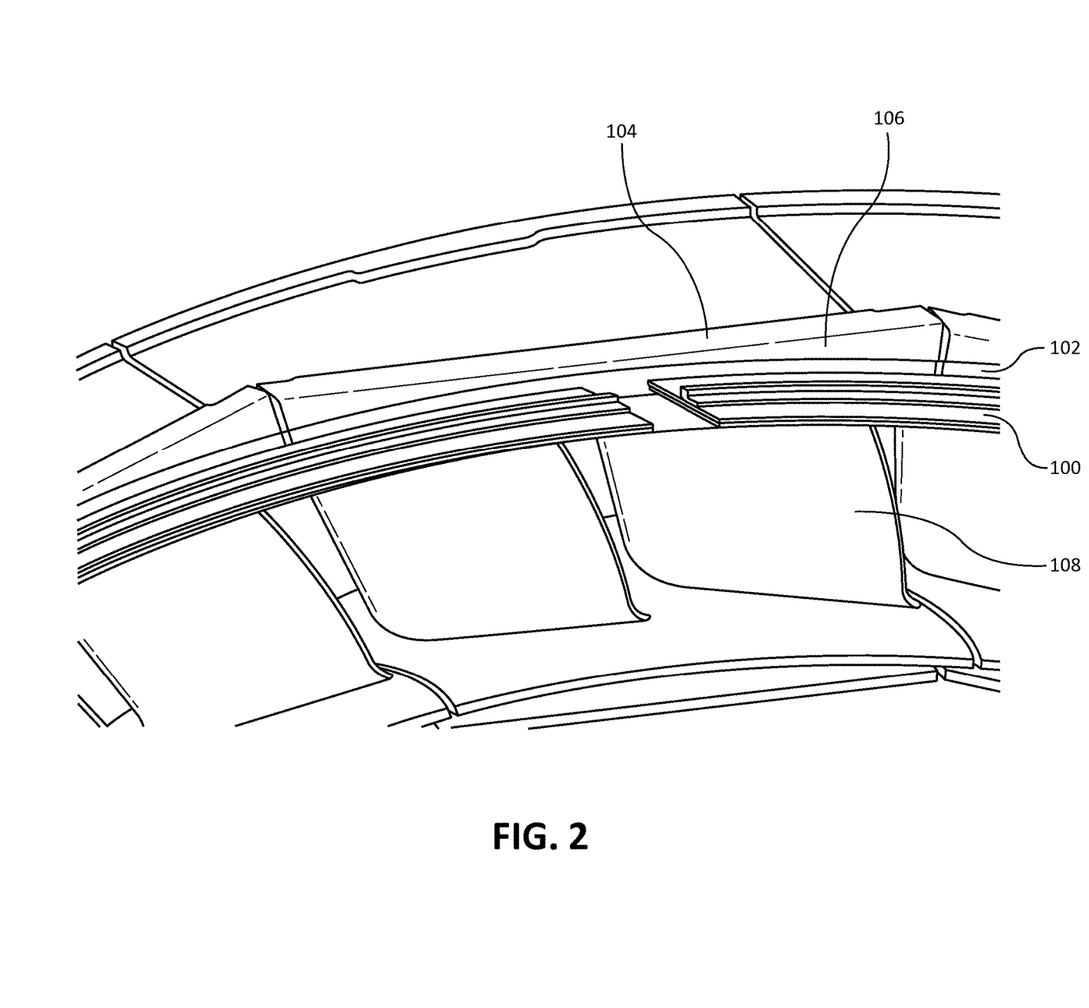
FIG. 2 illustrates a brush seal contacting a radial wall of a vane, in accordance with various embodiments.

With reference to FIG. 2, a brush seal 100 is shown with distal bristle pack 102 oriented in an axial direction and contacting vane 104 at radial surface 106, in accordance with various embodiments. Brush seal 100 may be an annular seal contacting vane 104 to provide sealing against radial surface 106. Brush seal 100 may seal gas path air (e.g., core flow-path C of FIG. 1) flowing over airfoil 108 from air on the opposite distal side of brush seal 100.

Figure 3:
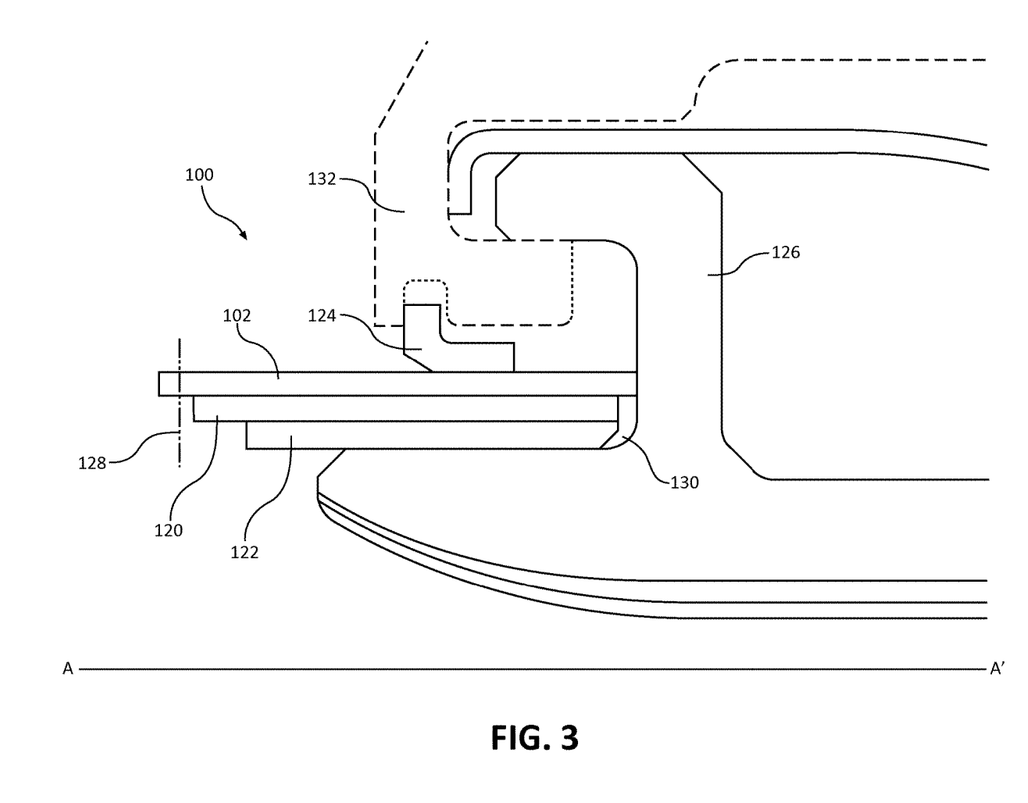
FIG. 3 illustrates a cross sectional view of a brush seal with dual bristle backs, in accordance with various embodiments.

With reference to FIG. 3, a cross sectional view of brush seal 100 is shown, in accordance with various embodiments. Brush seal 100 may be an annular seal centered about axis of rotation A-A'. Brush seal 100 may comprise distal bristle pack 102 and proximal bristle pack 120 with both bristle packs oriented in an axial direction. A backing plate 122 may be a metallic plate disposed radially inward from proximal bristle pack 120. A retention structure 124 (also referred to as a side plate) may be disposed radially outward from distal bristle pack 102. Retention structure 124 may comprise an annular protrusion configured to slot into seal support 132 in a manner that enables brush seal 100 to move in a radial direction. In that regard, retention structure 124 and seal support 132 may form a flange-and-groove mechanism that separates the forward and aft portions of distal bristle pack 102 and proximal bristle pack 120.

In various embodiments, brush seal 100 may have a sandwiched construction with layers welded together. Electron-beam (e-beam) welding may be used to form a joint between backing plate 122, proximal bristle pack 120, distal bristle pack 102, and retention structure 124 by applying the weld just aft of retention structure 124 from the proximal side of brush seal 100 towards the distal side of brush seal 100. E-beam welding is done by applying a beam of electrons to materials to be joined. The materials may melt and bond together in response to the beam. The weld may be formed continuously around brush seal 100. In various embodiments, the bristles in distal bristle pack 102 and proximal bristle pack 120 may be made from a cobalt alloy such as alloy L-605 (0.05-0.15% carbon, 19-21% chromium, Fe 3.0% max, manganese 1-2%, nickel 9-11%, phosphorus 0.4% max, sulfur 0.03% max, silicon 0.4% max, tungsten 14-16%, and a balance of Co) available under the trademark Haynes® 25.

In various embodiments, distal bristle pack 102 may comprise bristles with a smaller diameter than the bristles of proximal bristle pack 120. For example, the bristles of distal bristle pack 102 may have diameter of 0.0028 inches (0.071 mm) and the bristles of proximal bristle pack 120 may have a diameter of 0.006 inches (0.15 mm) In that regard, bristles of proximal bristle pack 120 may be twice as thick as bristles of distal bristle pack 102 to provide support for distal bristle pack 102.

Although the terms distal and proximal are used to describe proximal bristle pack 120 and distal bristle pack 102 based on the locations in FIG. 3, the positions may be selected such that the thicker bristle pack is on the low pressure side of the pressure differential. As depicted, proximal bristle pack 120 has a thicker diameter than distal bristle pack 102 because the pressure is greater on the distal side of brush seal 100 than on the proximal side. The increased thickness of proximal bristle pack 120 provides support for distal bristle pack 102 to resist deflection in a radial direction. The support thus enables sealing at high pressure differentials and/or improved axial overhang of distal bristle pack 102 over backing plate 122.

In various embodiments, retention structure 124 and backing plate 122 may be forged from an austenitic nickel-chromium-based alloy such as that sold under the trademark Inconel®, which is available from Special Metals Corporation of New Hartford, N.Y., USA. Retention structure 124 and backing plate 122 may then be turned down to a suitable thickness as depicted in FIG. 3.

In various embodiments, distal bristle pack 102 and proximal bristle pack 120 may comprise a similar thickness in the radial direction. For example, both bristle packs may comprise a thickness of 0.035 inches (0.89 mm) thick in the radial direction. The bristles of distal bristle pack 102 may lay at an angle of 60° in a tangential or circumferential direction relative to axis of rotation A-A', for example. Proximal bristle pack 120 may have bristles oriented at a 47.5° lay angle in a circumferential direction relative to axis of rotation A-A', for example. Thus, bristles of proximal bristle pack 120 may have a different lay angle than the bristles of distal bristle pack 102.

In various embodiments, distal bristle pack 102 may overhang (i.e., extend further forward than) proximal bristle pack 120. Line 128 may represent the position of a sealing surface configured to contact a forward portion of distal bristle pack 102. Proximal bristle pack 120 may not contact the surface represented by line 128. Backing plate 122 may provide support for both proximal bristle pack 120 and distal bristle pack 102. Both backing plate 122 and proximal bristle pack 120 may be spaced from radial surface 130 of blade outer air seal (BOAS) 126. The aft side of distal bristle pack 102 may contact the radial surface 130 of BOAS 126. BOAS 126 may interface with seal support 132 and provide radial support for brush seal 100 through backing plate 122.

Figure 4A:
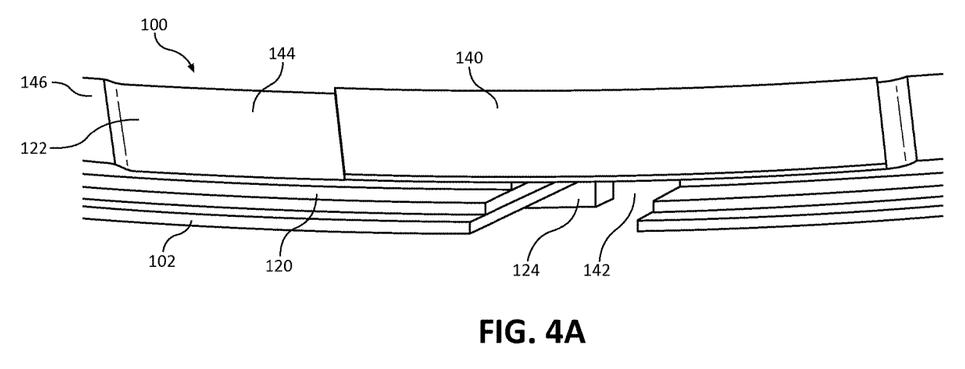
FIG. 4A illustrates a perspective view of a shiplap seal coupled to a backing plate , in accordance with various embodiments.
Figure 4B:
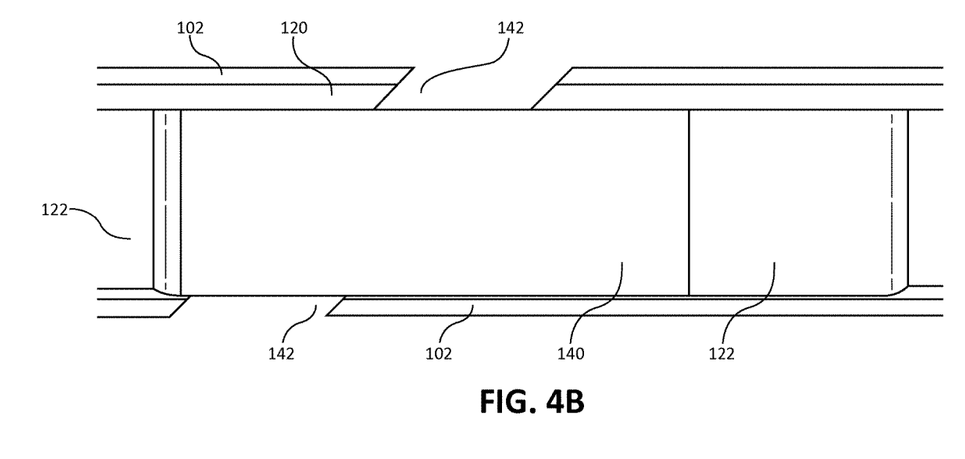
FIG. 4B illustrates a radially outward facing view of a shiplap seal coupled to a circular backing plate, in accordance with various embodiments.

With reference to FIGS. 4A and 4B, brush seal 100 is shown as viewed looking radially outward from axis of rotation A-A' of FIG. 3, in accordance with various embodiments. Brush seal 100 comprises a split 142 in its annular structure that is oriented in partially a circumferential and partially axial direction (i.e., diagonally severing the annular geometry of brush seal 100). Split 142 may be defined by backing plate 122, proximal bristle pack 120, distal bristle pack 102, and retention structure 124. Shiplap structure 140 may provide sealing over split 142 and allow for split 142 to expand and contract as brush seal 100 expands and contracts in response to thermal changes or otherwise shifts. Shiplap structure 140 may be coupled to backing plate 122 and disposed within recess 144 of surface 146 and span split 142.

Figure 5A:
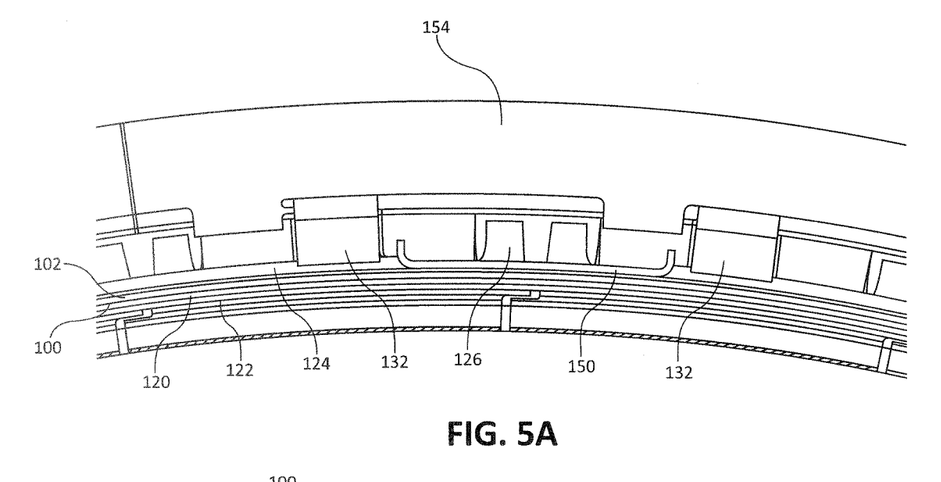
FIG. 5A illustrates an elevation view of a clocking mechanism coupled to a circular seal from aft looking forward, in accordance with various embodiments.
Figure 5B:
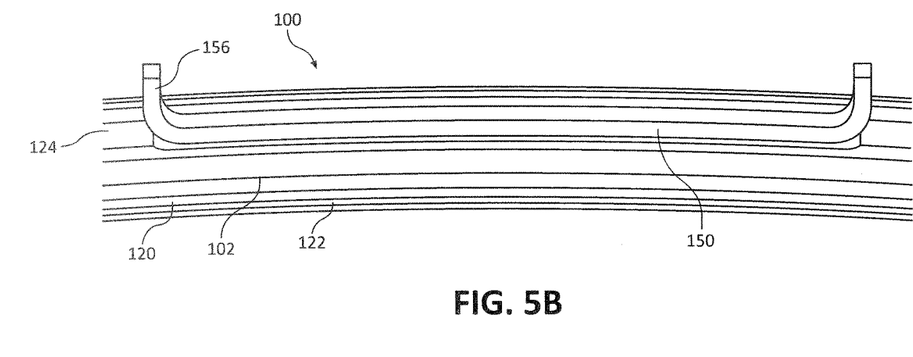
FIG. 5B illustrates a perspective view of a clocking mechanism coupled to a circular hook, in accordance with various embodiments.
Figure 5C:
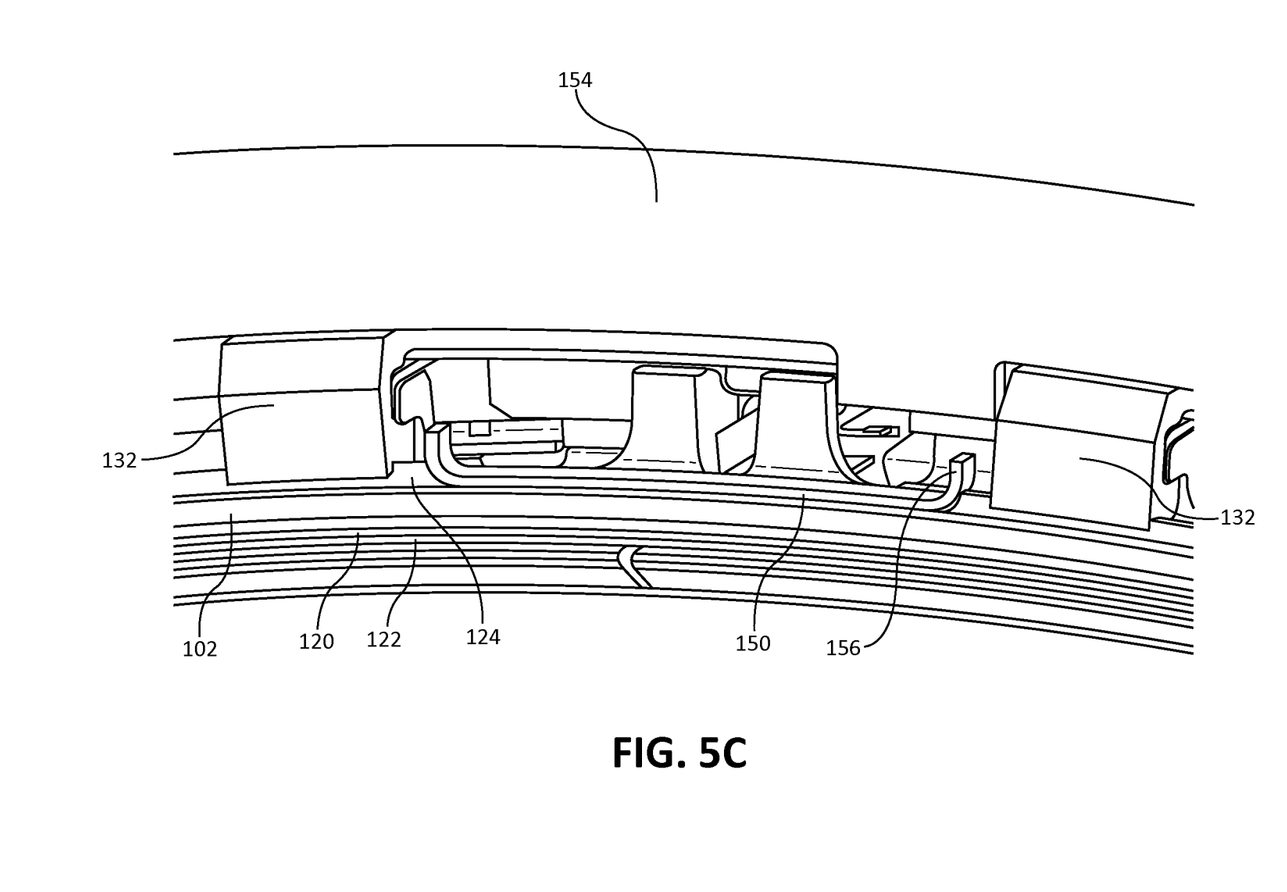
FIG. 5C illustrates a perspective view of a clocking mechanism disposed between backing plate hooks, in accordance with various embodiments.

With reference to FIGS. 5A-5C, brush seal 100 is shown from forward looking aft, in accordance with various embodiments. Brush seal 100 is disposed against blade outer air seal 126 with engine assembly 154 depicted for further context. An anti-rotation structure 150 may be coupled to retention structure 124 brush seal 100. Anti-rotation structure 150 may have arms 156 that protrude radially outward from brush seal 100 at either or both circumferential ends of anti-rotation structure 150. Arms 156 may be configured to contact seal support 132 and prevent further rotation by pressing against seal support 132. Anti-rotation structure 150 may be disposed approximately 180° opposite split 142 (of FIG. 4A). Anti-rotation structure may also serve as a clocking mechanism to orient brush seal 100 relative to engine assembly 154 during assembly.

Figure 6:
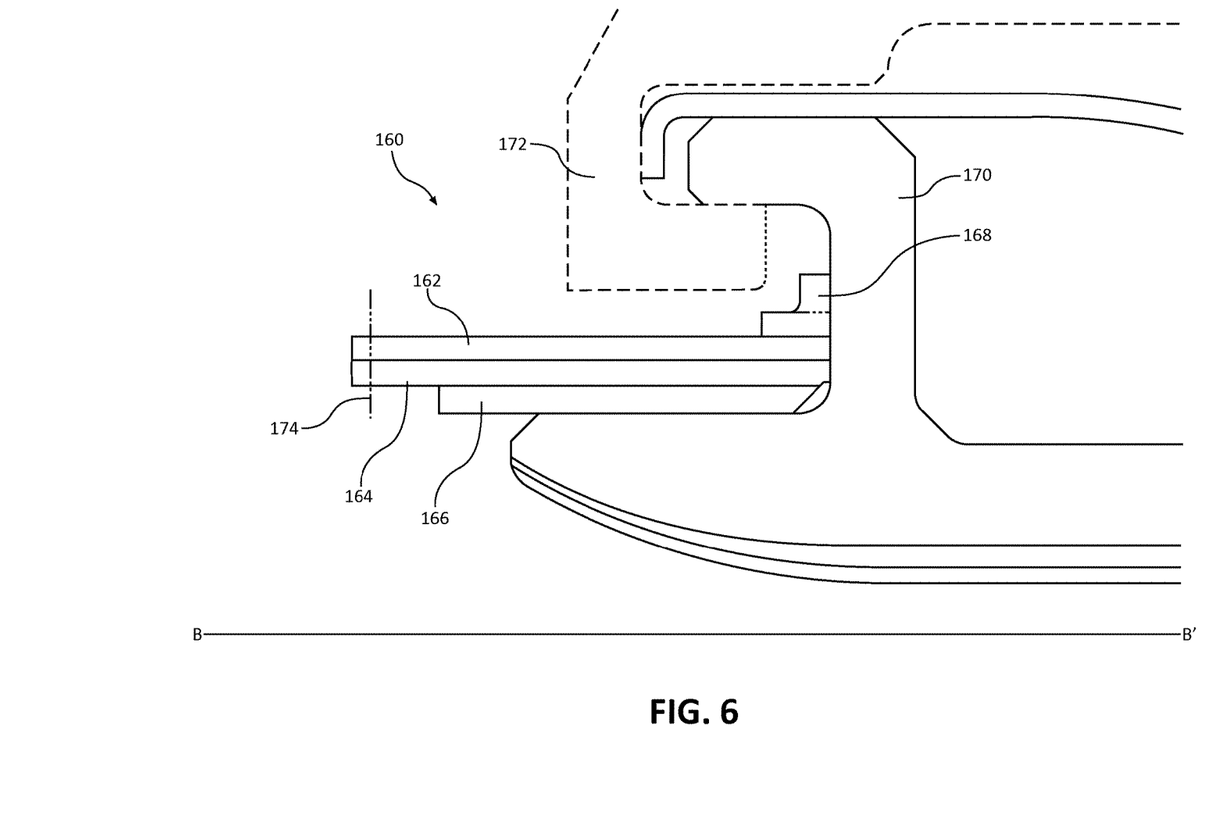
FIG. 6 illustrates a brush seal with dual bristle packs configured to contact a vane in accordance with various embodiments.

With reference to FIG. 6, brush seal 160 having an annular geometry is shown comprising a distal bristle pack 162 and a proximal bristle pack 164 oriented about axis of rotation B-B', in accordance with various embodiments. Brush seal 160 may be similar to brush seal 100 of FIGS. 2-5C with additional features detailed below. A retention structure 168 may be disposed radially outward from distal bristle pack 162 and sit flush with the aft ends of proximal bristle pack 164 and distal bristle pack 162. A backing plate 166 may be disposed radially inward from proximal bristle pack 164. The aft end of proximal bristle pack 164 and distal bristle pack 162 may contact BOAS 170. Retention structure 168 may comprise a radial protrusion disposed aft of seal support 172. Line 174 may represent a sealing surface forward of brush seal 100. Both distal bristle pack 162 and proximal bristle pack 164 may contact the sealing surface. In that regard, the bristle packs may comprise a same length in the axial direction.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brush seal, comprising:
    an annular backing plate;
    a first bristle pack coupled to the annular backing plate and oriented in an axial direction;
    a second bristle pack coupled to the first bristle pack and oriented in the axial direction, wherein a first bristle of the first bristle pack comprises a greater diameter than a second bristle of the second bristle pack, and wherein the first bristle pack is located between the second bristle pack and the annular backing plate;
    an annular side plate coupled to the second bristle pack, the annular side plate comprising an annular protrusion extending radially away from the second bristle pack; and
    an anti-rotation structure coupled to the annular side plate, the anti-rotation structure comprising:
        a body coupled to the annular side plate and extending circumferentially along the annular side plate, and
        an arm protruding radially outward from a circumferential end of the body.

2. The brush seal of claim 1, wherein the first bristle has a first diameter of 0.006 inches.

3. The brush seal of claim 2, wherein the second bristle has a second diameter of 0.0028 inches.

4. The brush seal of claim 3, wherein the first bristle pack is radially inward from the second bristle pack.

5. The brush seal of claim 3, wherein the first bristle is oriented at a 47.5 degree angle relative to an axis of the annular backing plate.

6. The brush seal of claim 3, wherein the second bristle is oriented at a 60 degree angle relative to an axis of the annular backing plate.

7. The brush seal of claim 1, wherein the annular backing plate, the first bristle pack, the second bristle pack, and the annular side plate are coupled by an e-beam weld.

8. The brush seal of claim 1, further comprising a shiplap structure spanning a split defined by the annular backing plate, wherein a surface of the annular backing plate opposite the first bristle pack comprises a recess proximate the split, and wherein the shiplap structure is disposed within the recess.

9. The brush seal of claim 8, wherein the anti-rotation structure is disposed 180° opposite the split.

10. The brush seal of claim 1, wherein the second bristle pack has a greater axial length than the first bristle pack.

11. The brush seal of claim 1, wherein the annular side plate is oriented flush with an aft end of the first bristle pack.

12. A high-pressure turbine, comprising:
    a vane;
    a seal support aft of the vane
    a blade outer air seal (BOAS) aft of the vane and coupled to the seal support;
    an annular brush seal disposed about an axis and coupled to the seal support, the annular brush seal comprising:
        a backing plate;
        a proximal bristle pack coupled to the backing plate;
        a distal bristle pack coupled to the proximal bristle pack, wherein a first bristle of the proximal bristle pack comprises a greater diameter than a second bristle of the distal bristle pack, and wherein the distal bristle pack is radially outward from the proximal bristle pack such that the distal bristle pack is oriented toward a bypass air flow-path and the proximal bristle pack is oriented toward a core air flow-path, and wherein the distal bristle pack is on a high pressure side of a pressure differential between the bypass air flow-path and the core air flow-path and the proximal bristle pack is on a low pressure side of the pressure differential between the bypass air flow-path and the core air flow-path;
        an annular side plate coupled to the distal bristle pack; and
        an anti-rotation structure coupled to the annular side plate, the anti-rotation structure comprising:
            a body coupled to the annular side plate and extending circumferentially along the annular side plate, and
            an arm protruding radially outward from a circumferential end of the body, wherein the arm is configured to contact the seal support to prevent rotation of the annular brush seal.

13. The high-pressure turbine of claim 12, wherein the first bristle has a first diameter of 0.006 inches.

14. The high-pressure turbine of claim 13, wherein the second bristle has a second diameter of 0.0028 inches.

15. The high-pressure turbine of claim 14, further comprising a shiplap structure spanning a split defined by the backing plate, wherein a surface of the backing plate opposite the proximal bristle pack comprises a recess proximate the split, and wherein the shiplap structure is disposed within the recess.

16. The high-pressure turbine of claim 14, wherein the first bristle is oriented at a degree 47.5 angle relative to the axis.

17. The high-pressure turbine of claim 14, wherein the second bristle is oriented at a 60 degree angle relative to the axis.

18. The high-pressure turbine of claim 12, wherein the annular side plate comprises a protrusion located within a slot in the seal support.

19. The high-pressure turbine of claim 12, wherein the distal bristle pack has a greater axial length than the proximal bristle pack.

20. A brush seal, comprising:
   a first annular bristle pack disposed about an axis and comprising a first bristle, wherein the first bristle has a first diameter of 0.0028 inches and is oriented at a 60 degree angle relative to the axis;
   a second annular bristle pack disposed about the axis and coupled to the first annular bristle pack, wherein the second annular bristle pack comprises a second bristle, wherein the second bristle has a second diameter of 0.006 inches and is oriented at a 47.5 degree angle relative to the axis;
   an annular backing plate disposed radially inward of the second annular bristle pack, wherein the second annular bristle pack is located between the first annular bristle pack and the annular backing plate, and wherein a surface of the annular backing plate opposite the second annular bristle pack comprises a recess, and wherein the recess is located proximate a split in the annular backing plate; and
   a shiplap structure spanning the split, wherein the shiplap structure is disposed within the recess.

* * * * *